(12) United States Patent
Fukuoka et al.

(10) Patent No.: US 11,011,806 B2
(45) Date of Patent: May 18, 2021

(54) CYLINDRICAL BATTERY

(71) Applicant: SANYO Electric Co., Ltd., Daito (JP)

(72) Inventors: Takahiro Fukuoka, Tokushima (JP);
Shuichi Yamashita, Tokushima (JP);
Yuma Yamaguchi, Osaka (JP);
Hiromichi Wakabayashi, Tokushima (JP)

(73) Assignee: SANYO Electric Co., Ltd., Daito (JP)

( * ) Notice: Subject to any disclaimer, the term of this patent is extended or adjusted under 35 U.S.C. 154(b) by 0 days.

(21) Appl. No.: 16/497,611

(22) PCT Filed: Mar. 22, 2018

(86) PCT No.: PCT/JP2018/011257
§ 371 (c)(1),
(2) Date: Sep. 25, 2019

(87) PCT Pub. No.: WO2018/180828
PCT Pub. Date: Oct. 4, 2018

(65) Prior Publication Data
US 2020/0044226 A1 Feb. 6, 2020

(30) Foreign Application Priority Data

Mar. 29, 2017 (JP) .............................. JP2017-064380

(51) Int. Cl.
*H01M 50/00* (2021.01)
*H01M 50/538* (2021.01)
(Continued)

(52) U.S. Cl.
CPC ..... *H01M 50/538* (2021.01); *H01M 10/0422* (2013.01); *H01M 10/0587* (2013.01); *H01M 50/10* (2021.01)

(58) Field of Classification Search
CPC .. H01M 2/263; H01M 10/0431; H01M 2/024; H01M 10/0422; Y02E 60/10
See application file for complete search history.

(56) References Cited

U.S. PATENT DOCUMENTS

| 2009/0081530 A1 | 3/2009 | Hashimoto et al. |
| 2011/0123846 A1* | 5/2011 | Kim ................... H01M 2/0413 429/94 |

(Continued)

FOREIGN PATENT DOCUMENTS

| JP | 63-35258 U | 3/1988 |
| JP | 11-26021 A | 1/1999 |

(Continued)

OTHER PUBLICATIONS

International Search Report dated Jun. 5, 2018, issued in counterpart Application No. PCT/JP2018/011257 (2 pages).

*Primary Examiner* — Cynthia H Kelly
*Assistant Examiner* — Monique M Wills
(74) *Attorney, Agent, or Firm* — Westerman, Hattori, Daniels & Adrian, LLP

(57) ABSTRACT

A cylindrical battery with an electrode body in which a negative electrode plate and a positive electrode plate connected to a plurality of positive electrode leads are rolled with a separator interposed therebetween, a first insulating plate disposed on the electrode body, a current-collection plate disposed on the first insulating plate, a second insulating plate disposed in contact with an opposite surface of the current-collection plate that opposes the first insulating plate, a sealing body, and an outer jacket can, wherein the first insulating plate has at least one through hole, the first positive electrode lead passes through the through hole and between the first insulating plate and the second insulating plate, is bent from the outer-circumference portion of the current-collection plate onto the current-collection plate and (Continued)

the second insulating plate is provided with a recessed portion to house the first positive electrode lead.

5 Claims, 3 Drawing Sheets

(51) Int. Cl.
*H01M 10/04* (2006.01)
*H01M 10/0587* (2010.01)
*H01M 50/10* (2021.01)

(56) References Cited

U.S. PATENT DOCUMENTS

| | | | |
|---|---|---|---|
| 2011/0129708 A1* | 6/2011 | Doo | H01M 2/0413 |
| | | | 429/94 |
| 2017/0346064 A1 | 11/2017 | Fukuoka et al. | |
| 2018/0130994 A1 | 5/2018 | Yamaguchi et al. | |

FOREIGN PATENT DOCUMENTS

| | | | |
|---|---|---|---|
| JP | 2006-302734 A | 11/2006 | |
| WO | 2016/098291 A1 | 6/2016 | |
| WO | 2016/174811 A1 | 11/2016 | |

* cited by examiner

CYLINDRICAL BATTERY

TECHNICAL FIELD

The present invention relates to a cylindrical battery including a positive electrode plate to which a plurality of positive electrode leads are connected.

BACKGROUND ART

In recent years, nonaqueous electrolyte secondary batteries having a high energy density have been widely used as drive power sources for high-power applications such as electric tools, power-assisted bicycles, and hybrid electric vehicles. Nonaqueous electrolyte secondary batteries are roughly classified into cylindrical batteries, square batteries, and pouch-type batteries in accordance with outer jacket members. Cylindrical batteries are resistant to impacts from the outside, and assembled batteries are readily produced by using a plurality of batteries. Therefore, cylindrical batteries are suitable for the above-described applications.

A cylindrical battery is produced by inserting an electrode body, in which a negative electrode plate and a positive electrode plate are rolled with a separator interposed therebetween, into an outer jacket can and sealing the opening portion by using a sealing body. In general, since the cylindrical battery uses a sealing body as a positive electrode outer terminal, the positive electrode plate in the electrode body has to be electrically connected to the sealing body. Regarding a nonaqueous electrolyte secondary battery, a method in which the positive electrode plate is electrically connected to the sealing body by using a lead is mainly adopted as a measure therefor.

According to the above-described method, a current-collection portion of the positive electrode plate is limited to the connection portion of the positive electrode lead. Consequently, even in the case of an elongated positive electrode plate, obtained load characteristics may be insufficient. As a result, the current-collection structure of the nonaqueous electrolyte secondary battery has been optimized by connecting a plurality of leads to the positive electrode plate.

In the cylindrical batteries disclosed in PTL 1 and 2, a plurality of leads connected to a positive electrode plate are connected to a current-collection plate disposed on an electrode body. The current-collection plate has a lead portion, and electrical connection between the positive electrode plate and a sealing body is ensured by connecting the lead portion to the sealing body. Each lead is connected to the current-collection plate by being bent from the outer circumference of the current-collection plate toward the inner circumference and, therefore, even when variations occur in the relative positional relationship between the leads that extend from the electrode body, the leads can be readily connected to the current-collection plate.

CITATION LIST

Patent Literature

PTL 1: International Publication No. 2016/098291
PTL 2: International Publication No. 2016/174811

SUMMARY OF INVENTION

Technical Problem

In the cylindrical batteries disclosed in PTL 1 and 2, two insulating plates are disposed between the current-collection plate and the electrode body. A through hole is located in the insulating plates disposed on the electrode body, and some of the plurality of leads connected to the positive electrode plate extend to the outer-circumference portion through the through hole. The influence on the electrode body of spatter or the like that occurs during welding of the lead and the current-collection plate can be effectively prevented by disposing an insulating plate on the current-collection plate.

In the cylindrical battery, a grooved portion that protrudes inward in the radial direction is disposed on the side surface in the vicinity of the opening portion of the outer jacket can, and the sealing body is fixed to the grooved portion by swaging with a gasket interposed therebetween. At this time, the sealing body or an insulating washer disposed under the grooved portion acts to press the electrode body and, thereby, the electrode body is reliably fixed inside the battery. Consequently, even when the cylindrical battery is subjected to vibration or drop impact, breakage of the lead is suppressed. However, since the lead is present between two insulating plates, a problem occurs in that the negative electrode plate deforms because the electrode body is locally subjected to a force from the insulating plate due to the thickness of the lead.

Solution to Problem

The present invention was realized in consideration of the above. A cylindrical battery according to an aspect of the present invention includes an electrode body in which a negative electrode plate and a positive electrode plate connected to a plurality of positive electrode leads are rolled with a separator interposed therebetween, a first insulating plate disposed on the electrode body, a current-collection plate disposed on the first insulating plate, a second insulating plate disposed in contact with an opposite surface of the current-collection plate that opposes the first insulating plate, a sealing body, and an outer jacket can, wherein the first insulating plate has at least one through hole, the plurality of positive electrode leads include at least one first positive electrode lead disposed on the inner-circumference side of the first insulating plate and at least one second positive electrode lead disposed on the outer-circumference side of the first insulating plate, the first positive electrode lead passes through the through hole and between the first insulating plate and the second insulating plate and is bent from the outer-circumference portion of the current-collection plate onto the current-collection plate, the second positive electrode lead passes outside the outer-circumference portion of the first insulating plate and is bent from the outer-circumference portion of the current-collection plate onto the current-collection plate, each of the first positive electrode lead and the second positive electrode lead is connected to the current-collection plate, the current-collection plate is electrically connected to the sealing body, and the second insulating plate is provided with a recessed portion to house the first positive electrode lead.

Advantageous Effects of Invention

According to the present invention, the cylindrical battery in which the electrode body is prevented from being locally pressurized by the insulating plate can be provided.

DESCRIPTION OF EMBODIMENTS

Figure 1:
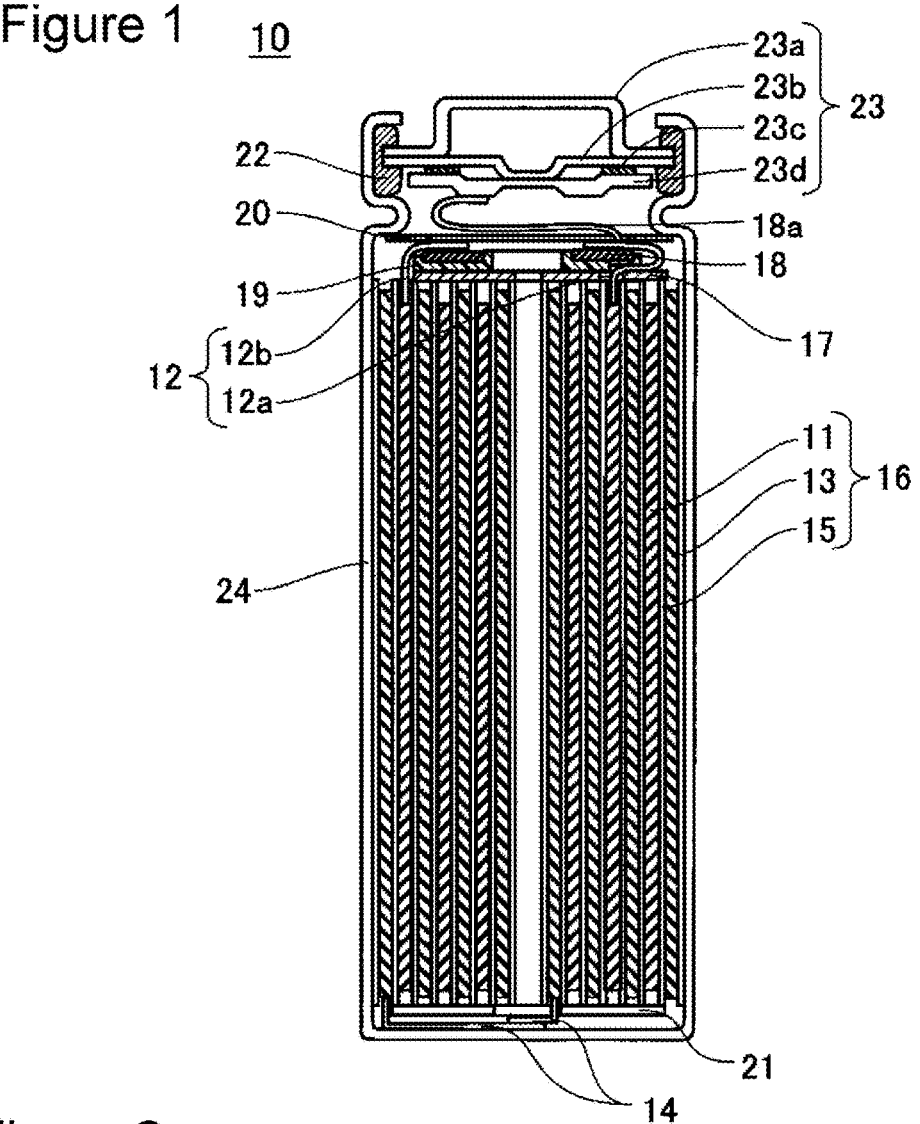
FIG. 1 is a sectional view of a nonaqueous electrolyte secondary battery according to an embodiment.

The embodiment according to the present invention will be described below with reference to a nonaqueous electrolyte secondary battery 10 shown in FIG. 1. However, the embodiment described below is an exemplification for the sake of facilitating understanding the technical idea of the present invention, and the present invention is not limited to the embodiment.

The nonaqueous electrolyte secondary battery 10 includes a cylindrical outer jacket can 24 with a bottom, an electrode body 16 contained in the outer jacket can 24, and a nonaqueous electrolyte. A grooved portion is disposed on the side surface in the vicinity of an opening portion of the outer jacket can 24, and a sealing body 23 is fixed to the grooved portion by swaging with a gasket interposed therebetween. Consequently, the inside of the battery is sealed.

The sealing body 23 is composed of an outer terminal cap 23a, an explosion-proof valve 23b, an annular insulating plate 23c, and an inner terminal plate 23d. The explosion-proof valve 23b and the inner terminal plate 23d are bonded to each other with the insulating plate 23c interposed therebetween, and the explosion-proof valve 23b is electrically connected to the flange portion of the outer terminal cap 23a. If the pressure inside the battery increases, the explosion-proof valve 23b deforms, the bonding portion to the inner terminal plate 23d breaks, and the current path inside the sealing body 23 is interrupted. It is also possible that the inner terminal plate 23d is provided with a thin-walled easy-to-break portion and that a current path is interrupted by breakage of the easy-to-break portion. If the pressure inside the battery further increases after interruption of the current path, the explosion-proof valve 23b cleaves so as to discharge gas inside the battery.

Figure 2:
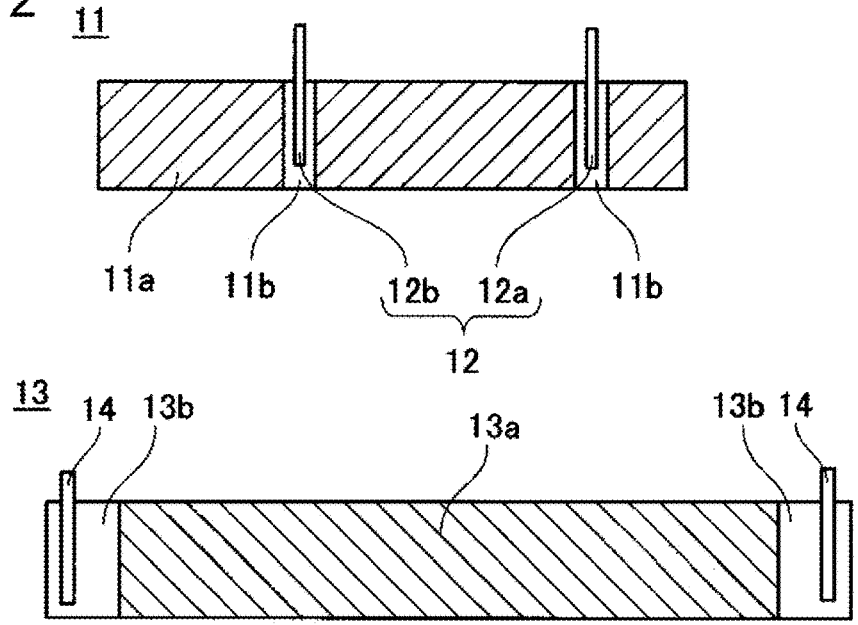
FIG. 2 is a plan view of a positive electrode plate and a negative electrode plate according to an embodiment.

The electrode body 16 is produced by rolling the positive electrode plate 11 and the negative electrode plate 13 with a separator 15 interposed therebetween. As shown in FIG. 2, the positive electrode plate 11 and the negative electrode plate 13 are provided with positive electrode collector exposed portions 11b and negative electrode collector exposed portions 13b, respectively. A positive electrode lead 12 is connected to each positive electrode collector exposed portion 11b, and a negative electrode lead 14 is connected to each negative electrode collector exposed portion 13b. Each positive electrode lead 12 is connected to the current-collection plate 18 and is electrically connected to the inner terminal plate of the sealing body through the lead portion 18a of the current-collection plate 18. The negative electrode leads 14 are bent so as to become parallel to the bottom portion of the outer jacket can 24, and portions stacked on one another are connected to the bottom portion of the outer jacket can 24. For details, the outer-circumference-side negative electrode lead 14 of the electrode body 16 is bonded to the bottom portion of the outer jacket can 24, and the inner-circumference-side negative electrode lead 14 is bonded onto the outer-circumference-side lead 14.

The method for connecting the positive electrode leads 12 to the current-collection plate 18 will be described with reference to FIG. 3. Two positive electrode leads 12 composed of a first positive electrode lead 12a and a second positive electrode lead 12b extend from the electrode body 16 immediately after production (FIG. 3(a)). The first positive electrode lead 12a is inserted into a through hole 17a of a first insulating plate 17, and the first insulating plate 17 is arranged on the electrode body 16 (FIG. 3(b)). At this time, the second positive electrode lead 12b is arranged on the outer-circumference side of the first insulating plate 17. Subsequently, the first positive electrode lead 12a and the second positive electrode lead 12b are bent outward in the radial direction of the electrode body 16 (FIG. 3(c)), and the current-collection plate 18 provided with a second insulating plate 19 is arranged on the first insulating plate 17 (FIG. 3(d)). Next, the first positive electrode lead 12a and the second positive electrode lead 12b are bent and connected onto the current-collection plate 18 (FIG. 3(e)). Regarding the connection method, for example, laser welding may be used. Finally, to insert the electrode body into the outer jacket can, the lead portion 18a of the current-collection plate 18 is bent at an angle of 90° (FIG. 3(f)).

Figure 4:
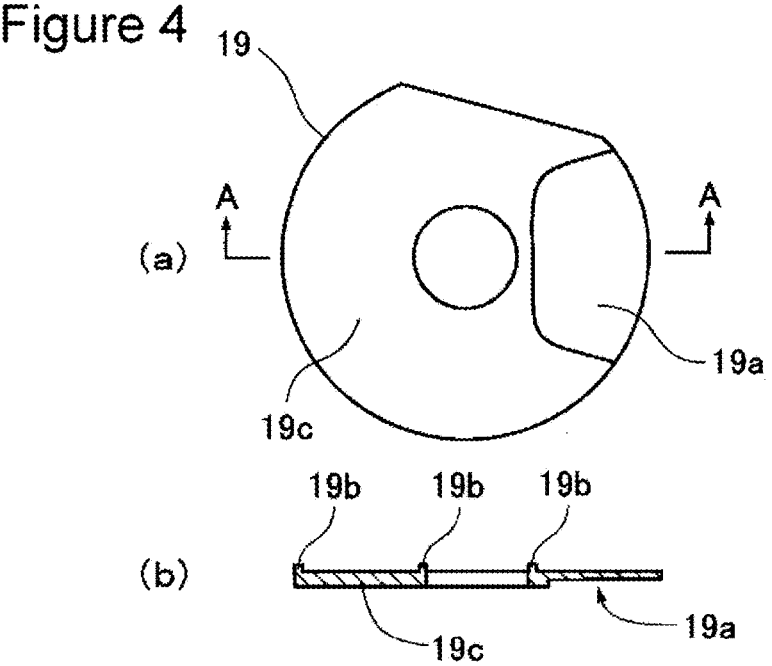
FIG. 4(a) is a plan view of a second insulating plate according to an embodiment.
FIG. 4(b) is a sectional view along line A-A in FIG. 4(a).
Figure 5:
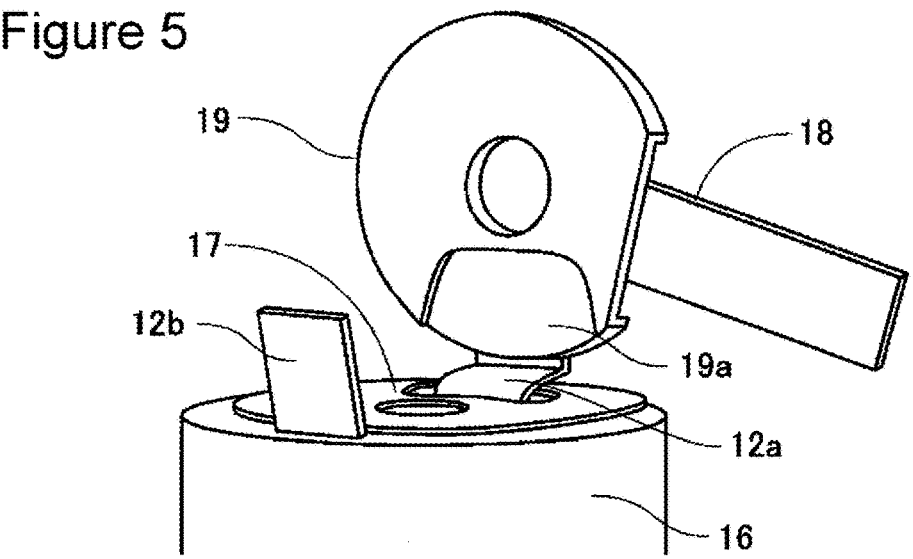
FIG. 5 is a perspective view of a key portion of an electrode body in the state in which a first positive electrode lead connected to a current-collection plate is spread outward in the radial direction of a first insulating plate.

FIG. 4(a) is a plan view of the second insulating plate 19 when viewed from the electrode body 16 side. Since the first positive electrode lead 12a is interposed between the first insulating plate 17 and the second insulating plate 19, the first positive electrode lead 12a hinders contact between the first insulating plate 17 and the second insulating plate 19. Therefore, in the present embodiment, to reduce the influence of the thickness of the first positive electrode lead 12a, the opposite surface of the second insulating plate 19 that opposes the first insulating plate 17 is provided with a recessed portion 19a, and the first positive electrode lead 12a is housed in the recessed portion 19a. When the recessed portion 19a is formed so as to house the first positive electrode lead 12a, even when the depth of the recessed portion 19a is small, the effect of the present invention is exerted. However, it is preferable that the depth of the recessed portion 19a be greater than or equal to the thickness of the first positive electrode lead 12a. The depth of the recessed portion 19a is not limited to being uniform. For example, the outer-circumference-side depth may be greater than the inner-circumference-side depth. To clarify the positional relationship between the second insulating plate 19 and the current-collection plate 18, FIG. 5 shows a perspective view of a key portion of the electrode body 16 in the state in which the first positive electrode lead 12a connected to the current-collection plate 18 is spread outward in the radial direction of the first insulating plate 17.

On the contact surface of the second insulating plate 19 with the current-collection plate 18, protrusion portions 19b are disposed along the outer circumference and the inner circumference of the second insulating plate 19. It is preferable that the protrusion portion 19b be disposed on at least one of the inner circumference and the outer circumference. Disposition of the protrusion portion 19b suppresses positional deviation of the current-collection plate 18 on the second insulating plate 19 from occurring. The current-collection plate 18 and the second insulating plate 19 can be fixed to each other and made into an integrated component by exploiting the protrusion portion 19b. The current-collection plate 18 and the second insulating plate 19 may be fixed to each other by an adhesive or a double-faced tape without disposing the protrusion portion 19b. In this regard, it is not always necessary that the current-collection plate 18 and the second insulating plate 19 be fixed to each other.

As shown in FIG. 1, a third insulating plate 21 is disposed on the end portion of the electrode body 16 that is near to the bottom of the outer jacket can 24, and an annular insulating plate 20 is disposed on the current-collection plate 18. Preferably, the annular insulating plate 20 and the third insulating plate 21 are used to suppress an internal short circuit of the battery from occurring. Regarding the first, second, and third insulating plates 17, 19, and 21 and the annular insulating plate 20, preferably, a resin material that can be stably present inside the battery is used, and examples of the resin material include polyolefin resins, polyimide resins, polyphenylene sulfide resins, and phenol resins.

Regarding the positive electrode lead 12 and the current-collection plate 18, preferably, a metal material that can be stably present inside the battery even when being exposed to a positive electrode potential and that has excellent electron conductivity is used, and examples of such a metal material include aluminum and aluminum alloys. Meanwhile, regarding the negative electrode lead 14, preferably, a metal material that can be stably present inside the battery even when being exposed to a negative electrode potential and that has excellent electron conductivity is used, and examples of such a metal material include nickel, copper, and alloys containing nickel and copper.

Next, the constituent materials and the production methods of the positive electrode plate 11, the negative electrode plate 13, the separator 15, and the nonaqueous electrolyte that can be used for the cylindrical nonaqueous electrolyte secondary battery 10 according to the present embodiment will be described.

The positive electrode plate 11 includes a positive electrode collector and positive electrode mix layers 11a disposed on both surfaces of the positive electrode collector. The positive electrode mix layer 11a may be formed by applying a positive electrode mix slurry containing a positive electrode active material to the positive electrode collector and performing drying. Intermittent application of the positive electrode mix slurry can form positive electrode collector exposed portions 11b. The positive electrode plate 11 is obtained by compressing the positive electrode mix layer 11a to a predetermined thickness by using a roller and bonding the positive electrode leads 12 to the positive electrode collector exposed portions 11b. In the present embodiment, one lead is used as the first positive electrode lead 12a to be inserted into the through hole 17a in the first insulating plate 17, but a plurality of leads may be used as the first positive electrode lead. Likewise, a plurality of leads may be used as the second positive electrode lead disposed outside the outer-circumference portion of the first insulating plate 17.

Regarding the positive electrode active material, a lithium transition metal complex oxide capable of occluding and releasing lithium ions may be used. Examples of the lithium transition metal complex oxide include general formula $LiMO_2$ (M represents at least one of Co, Ni, and Mn), $LiMn_2O_4$, and $LiFePO_4$. These may be used alone or at least two types may be used in combination, and at least one selected from a group consisting of Al, Ti, Mg, and Zr may be added or substituted for the transition metal element.

The negative electrode plate 13 includes a negative electrode collector and negative electrode mix layers 13a disposed on both surfaces of the negative electrode collector. The negative electrode mix layer 13a may be formed by applying a negative electrode mix slurry containing a negative electrode active material to the negative electrode collector and performing drying. Intermittent application of the negative electrode mix slurry can form negative electrode collector exposed portions 13b. The negative electrode plate 13 is obtained by compressing the negative electrode mix layer 13a to a predetermined thickness by using a roller and bonding the negative electrode leads 14 to the negative electrode collector exposed portions 13b. In the present embodiment, the negative electrode lead 14 is bonded to each of the rolling-start-end portion and the rolling-stop-end portion of the negative electrode plate. However, the number of negative electrode leads and the bonding position are not limited.

Regarding the negative electrode active material, a carbon material or a metal oxide capable of occluding and releasing lithium ions or a metal material capable of being alloyed with lithium may be used. Examples of the carbon material include graphite, for example, natural graphite and artificial graphite. Examples of the metal oxide or the metal material include silicon and tin and oxides of these. The carbon material, the metal oxide, and the metal material may be used alone, or at least two types may be used in combination. Graphite and silicon oxide may be used in combination.

Regarding the separator, a microporous film containing a polyolefin such as polyethylene (PE) or polypropylene (PP) as a primary component may be used. A single layer of the microporous film may be used, or at least two layers may be stacked and used. In a multilayer separator composed of at least two layers, it is preferable that a layer containing low-melting-temperature polyethylene (PE) as a primary component be used as the intermediate layer and polypropylene (PP) having excellent oxidation resistance be used as the surface layer. In addition, inorganic particles such as aluminum oxide ($Al_2O_3$), titanium oxide ($TiO_2$), or silicon oxide ($SiO_2$) may be added to the separator. Such inorganic particles may be carried in the separator or applied to the separator surface with a binder.

A nonaqueous electrolyte in which a lithium salt serving as an electrolyte salt is dissolved into a nonaqueous solvent serving as a solvent may be used. Meanwhile, a nonaqueous electrolyte in which a gel polymer is used instead of the nonaqueous solvent may also be used.

Regarding the nonaqueous solvent, cyclic carbonic acid esters, chain carbonic acid esters, cyclic carboxylic acid esters, and chain carboxylic acid esters may be used. Preferably, at least two types of these are used in combination. Examples of the cyclic carbonic acid ester include ethylene carbonate (EC), propylene carbonate (PC), and butylene carbonate (BC). In this regard, a cyclic carbonic acid ester in which some hydrogen atoms are substituted with fluorine atoms, such as fluoroethylene carbonate (FEC), may be used. Examples of the chain carbonic acid ester include dimethyl carbonate (DMC), ethylmethyl carbonate (EMC), diethyl carbonate (DEC), and methylpropyl carbonate (MPC). Examples of the cyclic carboxylic acid ester include γ-butyrolactone (γ-BL) and γ-valerolactone (γ-VL). Examples of the chain carboxylic acid ester include methyl pivalate, ethyl pivalate, methyl isobutyrate, and methyl propionate.

Examples of the lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, and $Li_2B_{12}Cl_{12}$. Of these, $LiPF_6$ is particularly preferable, and the concentration in the nonaqueous electrolyte is preferably 0.5 to 2.0 mol/L. Other lithium salts, for example, $LiBF_4$, may be mixed into $LiPF_6$.

EXAMPLES (Production of Positive Electrode Plate)

Figure 6:
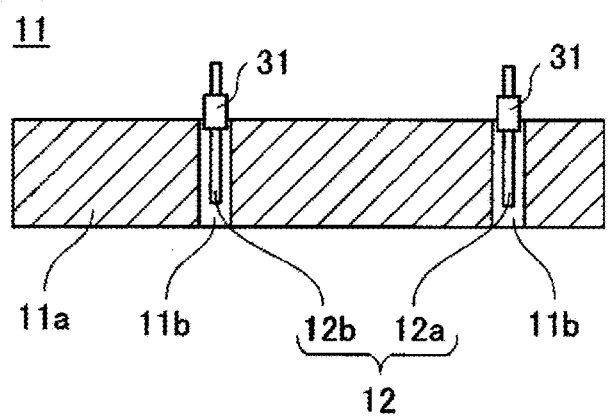
FIG. 6 is a plan view of a positive electrode plate according to an embodiment.

Lithium cobaltate ($LiCoO_2$) serving as a positive electrode active material, carbon black serving as a conductive agent, and polyvinylidene fluoride (PVdF) serving as a binder were mixed at a mass ratio of 94:3:3. The resulting mixture was kneaded in N-methyl-2-pyrrolidone (NMP) serving as a dispersion medium so as to produce a positive electrode mix slurry. The resulting positive electrode mix slurry was intermittently applied to both surfaces of an aluminum positive electrode collector having a thickness of 15 μm by a doctor blade method, and drying was performed so as to produce a positive electrode mix layer 11a. At this time, as shown in FIG. 2, the positive electrode plate was provided with positive electrode collector exposed portions 11b. The positive electrode mix layer 11a was compressed by using a roller, and the electrode plate after compression was cut into a predetermined dimension. Finally, positive electrode leads 12 are bonded to the positive electrode collector exposed portions 11b so as to produce a positive electrode plate 11. The positive electrode lead 12 arranged on the rolling-start side of the positive electrode plate 11 corresponded to the first positive electrode lead 12a, and the positive electrode lead 12 arranged on the rolling-stop side of the positive electrode plate 11 corresponded to the second positive electrode lead 12b. In the present example, as shown in FIG. 6, an insulating tape 31 was bonded to the front and the back of the positive electrode lead 12. After the positive electrode leads 12 are bonded, the insulating tape was also bonded to the front and the back of the positive electrode collector exposed portions 11b, although not shown in the drawing.

(Production of Electrode Body)

The thus produced positive electrode plate 11 and a negative electrode plate 13 were rolled with a separator 15 interposed therebetween so as to produce an electrode body 16. A polyethylene microporous film was used as the separator 15.

(Preparation of Nonaqueous Electrolyte)

A nonaqueous solvent used for a nonaqueous electrolytic solution was prepared by mixing ethylene carbonate (EC), propylene carbonate (PC), and diethyl carbonate (DEC) such that the volume ratio became 10:10:80 (25° C., 1 atmosphere). A nonaqueous electrolyte was prepared by dissolving lithium hexafluorophosphate ($LiPF_6$) serving as an electrolyte salt into the resulting nonaqueous solvent such that 1.0 mol/L was ensured.

(Production of Nonaqueous Electrolyte Secondary Battery)

Figure 3:
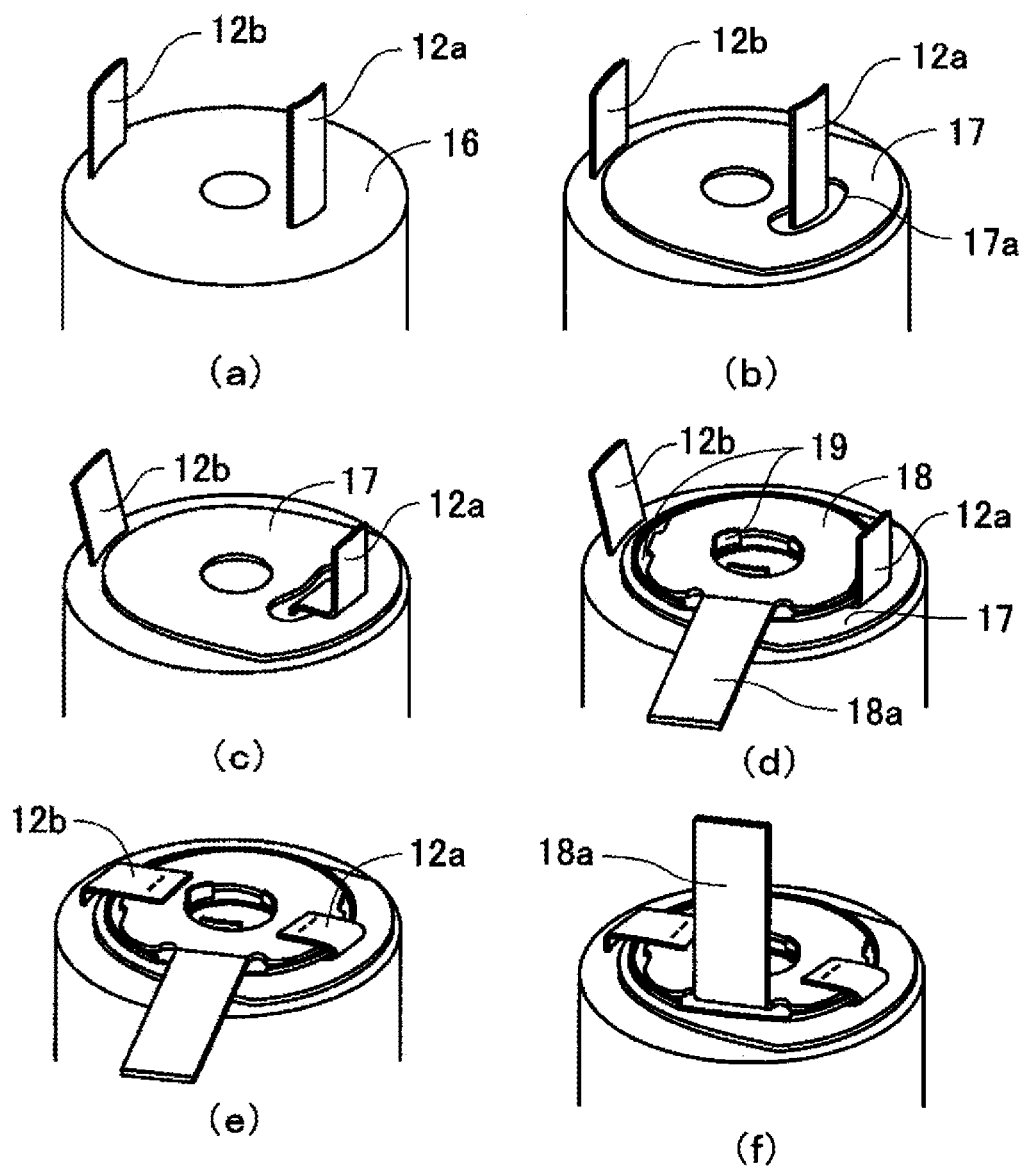
FIG. 3(a) to FIG. 3(f) are perspective views showing the method for connecting positive electrode leads that extend from an electrode body according to an embodiment to a current-collection plate in the order of steps.

In the same manner as in the embodiment according to the present disclosure, the first positive electrode lead 12a and the second positive electrode lead 12b were connected to the current-collection plate 18 following the procedure shown in FIG. 3. Laser welding was used as the connection method. A second insulating plate 19 shown in FIG. 4 was formed on the opposite surface of the current-collection plate 18 that opposes the first insulating plate 17. In the present example, the insulating tape 31 bonded to the front and the back of the first positive electrode lead 12a was interposed, in addition to the first positive electrode lead 12a, between the first insulating plate 17 and the second insulating plate 19. The total thickness of the positive electrode lead 12a and the insulating tape 31 on the front and the back of the first positive electrode lead 12a was 0.25 mm. Therefore, the depth of a recessed portion 19a of the second insulating plate 19 was set to be 0.3 mm. In the case in which the insulating tape 31 in addition to the first positive electrode lead 12a is interposed between the first insulating plate 17 and the second insulating plate 19, the depth of the recessed portion 19a is preferably set to be greater than or equal to the total thickness of the first positive electrode lead 12a and the insulating tape 31. In this regard, the thickness of the plain surface portion 19c of the second insulating plate 19 excluding the recessed portion 19a and the protrusion portion 19b was set to be 0.5 mm.

A third insulating tape 21 was arranged on the end portion from which the negative electrode leads 14 of the electrode body 16 extended, and the electrode body 16 was inserted into an outer jacket can 24. An annular insulating plate 20 was arranged on the current-collection plate 18. The negative electrode leads 14 were connected to the bottom portion of the outer jacket can 24, and grooved portion was formed on the side surface in the vicinity of the opening portion of the outer jacket can 24. A lead portion 18a of the current-collection plate 18 was connected to a sealing body 23 and, thereafter, the nonaqueous electrolyte was injected into the outer jacket can 24. Finally, the sealing body 23 was fixed to the grooved portion of the outer jacket can 24 by swaging with a gasket 22 interposed therebetween so as to produce the nonaqueous electrolyte secondary battery 10 according to the example.

Comparative Example 1

A nonaqueous electrolyte secondary battery according to comparative example 1 was produced in the same manner as in the example except that the second insulating plate was not provided with the recessed portion.

Comparative Example 2

A nonaqueous electrolyte secondary battery according to comparative example 2 was produced in the same manner as in the example except that the second insulating plate was not provided with the recessed portion and the thickness of the plain surface portion of the second insulating plate was set to be 0.2 mm. In this regard, the thickness of the plain surface portion of the second insulating plate in comparative example 2 was in accord with the residual thickness of the recessed portion of the second insulating plate in the example.

(Examination of Presence or Absence of Deformation of Negative Electrode Plate)

With respect to 20 batteries each of the example and comparative examples 1 and 2, presence or absence of deformation of the negative electrode plate was examined by computed tomography using X-rays. The battery in which deformation of the negative electrode plate was observed was rated as NG. Table 1 shows the number of batteries rated as NG.

(Drum Test)

A drum test of 6 batteries each of the example and comparative examples 1 and 2 was performed as described below. A drum containing 6 batteries was rotated at a constant number of revolutions for a predetermined time. The internal resistance of the battery before and after the test was measured, and the battery having the internal resistance after the test of 1.2 times or more the internal resistance before the test was rated as NG. Table 1 shows the number of batteries rated as NG in accordance with result of the drum test.

TABLE 1

| | Presence or absence of deformation of negative electrode plate | Drum test |
|---|---|---|
| Example | 0/20 NG | 0/6 NG |
| Comparative example 1 | 6/20 NG | 0/6 NG |
| Comparative example 2 | 0/20 NG | 4/6 NG |

Regarding the example, neither deformation of the negative electrode plate after assembling the battery nor an increase in the internal resistance due to the drum test was observed. Regarding comparative example 1 in which the second insulating plate provided with no recessed portion was used, an increase in the internal resistance due to the drum test was not observed, but deformation of the negative electrode plate after assembling the battery was observed. The cause for this is conjectured to be that, in comparative example 1, the positive electrode lead was interposed between the first insulating plate and the second insulating plate and a pressure was locally applied from the first insulating plate to the electrode body. The deformed portion of the negative electrode plate did not oppose the positive electrode plate and, therefore, the deformation of the negative electrode plate did not directly cause an internal short-circuit problem and the like. However, from the viewpoint of production quality of the cylindrical battery, it is preferable that such deformation of the negative electrode plate be prevented.

Regarding comparative example 2 in which the second insulating plate with the plain surface portion having a reduced thickness, deformation of the negative electrode plate after assembling the battery was not observed, but an increase in the internal resistance due to the drum test was observed. This is conjectured to be the result of an occurrence of damage to the positive electrode lead or the negative electrode lead during the drum test because, in comparative example 2, the force to fix the electrode body to the inside of the battery was insufficient. Consequently, it is clear that, according to an aspect of the present invention, a cylindrical battery having excellent output characteristics and safety and having high quality can be provided.

INDUSTRIAL APPLICABILITY

According to the present invention, a cylindrical battery having excellent output characteristics and safety and having high quality can be provided. Therefore the present invention has high potential to be industrially used.

REFERENCE SIGNS LIST 10 nonaqueous electrolyte secondary battery
11 positive electrode plate
12 positive electrode lead
12a first positive electrode lead
12b second positive electrode lead
13 negative electrode plate
14 negative electrode lead
15 separator
16 electrode body
17 first insulating plate
17a through hole
18 current-collection plate
18a lead portion
19 second insulating plate
19a recessed portion
19b protrusion portion
19c plain surface portion
20 insulating plate
21 third insulating plate
22 gasket
23 sealing body
24 outer jacket can
31 insulating tape

The invention claimed is:

1. A cylindrical battery comprising an electrode body in which a negative electrode plate and a positive electrode plate connected to a plurality of positive electrode leads are rolled with a separator interposed therebetween, a first insulating plate disposed on the electrode body, a current-collection plate disposed on the first insulating plate, a second insulating plate disposed in contact with an opposite surface of the current-collection plate that opposes the first insulating plate, a sealing body, and an outer jacket can,
    wherein the first insulating plate has at least one through hole,
    the plurality of positive electrode leads include at least one first positive electrode lead disposed on the inner-circumference side of the first insulating plate and at least one second positive electrode lead disposed on the outer-circumference side of the first insulating plate,
    the first positive electrode lead passes through the through hole and between the first insulating plate and the second insulating plate and is bent from the outer-circumference portion of the current-collection plate onto the current-collection plate,
    the second positive electrode lead passes outside the outer-circumference portion of the first insulating plate and is bent from the outer-circumference portion of the current-collection plate onto the current-collection plate,
    each of the first positive electrode lead and the second positive electrode lead is connected to the current-collection plate,
    the current-collection plate is connected to the sealing body, and
    the opposite surface of the second insulating plate that opposes the first insulating plate is provided with a recessed portion to house the first positive electrode lead.

2. The cylindrical battery according to claim 1, wherein the depth of the recessed portion is greater than or equal to the thickness of the first positive electrode lead.

3. The cylindrical battery according to claim 1, wherein in addition to the first positive electrode lead, an insulating tape bonded to the first positive electrode lead is interposed between the first insulating plate and the second insulating plate.

4. The cylindrical battery according to claim 3, wherein the depth of the recessed portion is greater than or equal to the total thickness of the positive electrode lead and the insulating tape that are interposed between the first insulating plate and the second insulating plate.

5. The cylindrical battery according to claim 1, wherein the current-collection plate and the second insulating plate are fixed to each other.

* * * * *